United States Patent [19]

Wilson

[11] Patent Number: 4,461,453
[45] Date of Patent: Jul. 24, 1984

[54] VALVE FOR FLUID SYSTEMS

[76] Inventor: Wesley P. Wilson, P.O. Box 395, Phelan, Calif. 92371

[21] Appl. No.: 440,795

[22] Filed: Nov. 12, 1982

Related U.S. Application Data

[63] Continuation of Ser. No. 297,108, Aug. 28, 1981, abandoned.

[51] Int. Cl.³ ............................................. F16K 31/52
[52] U.S. Cl. ................................... 251/251; 137/446; 137/449; 137/DIG. 2; 251/368
[58] Field of Search .................... 74/54; 137/446, 449, 137/522, DIG. 2; 251/251, 318, 360, 361, 368

[56] References Cited

U.S. PATENT DOCUMENTS

| | | | |
|---|---|---|---|
| 766,416 | 8/1904 | Booth | 137/449 |
| 877,063 | 1/1908 | Edes et al. | 137/446 |
| 948,702 | 2/1910 | Martin | 137/522 |
| 1,476,029 | 12/1923 | Black | 137/446 |
| 1,496,317 | 6/1924 | Johnson | 137/449 |
| 1,538,404 | 5/1925 | Laird | 137/446 |
| 1,783,891 | 12/1930 | Thibert | 137/449 |
| 2,038,229 | 4/1936 | Martin et al. | 251/251 |
| 2,682,889 | 7/1954 | McLaughlin | 137/449 |
| 2,946,343 | 7/1960 | Sterrett et al. | 137/449 |
| 3,040,770 | 6/1962 | Boettcher et al. | 251/368 |

Primary Examiner—George L. Walton
Attorney, Agent, or Firm—Bruce L. Birchard

[57] ABSTRACT

By providing direct activation of the ball element by the cam lobe of a cam member in a ball valve, instead of utilizing additional links between the cam lobe and the ball member, positive valve action is achieved, the cost and complexity of the valve is decreased and the problems which arise from corrosion and sediment accumulation in linking elements are avoided.

7 Claims, 2 Drawing Figures

VALVE FOR FLUID SYSTEMS

RELATED CO-PENDING APPLICATION

This application is a continuation of my prior application Ser. No. 06/297,108 filed Aug. 28, 1981 now abandoned and entitled An Improved Valve for Fluid Systems.

BACKGROUND OF THE INVENTION

1. Field of the Invention

This invention relates to valves for control of liquid flow and, more specifically, to ball valves with enhanced performance.

2. Description of the Prior Art

A search of the patent art related to ball valves which are related to the subject matter of the present application revealed the following patents. None of them anticipate the claims of this application, for the reasons which are recited.

U.S. Pat. No. 1,044,311 (Wall) issued Nov. 12, 1912 fails to show a ball valve in which the ball is moved by direct contact between a rotatable cam lobe member to effect opening and closing of the valve. In Wall, ball 9 is raised and lowered by a plunger 19 moving in water discharging path 7. Such a structure will have the tendency to accumulate sediment in path 7 causing plunger 7 to stick in a partially upwardly extended position, thus preventing positive shut-off by ball 9. The present invention avoids that problem by eliminating passage 7 and having no sliding motion in a constricted area.

U.S. Pat. No. 1,005,044 (Koch) issued Oct. 3, 1911 has a constricted passage 7 and a plunger 20, being closely similar to the Wall patent. The distinctions between this invention and that in the Koch patent are similar to those recited in connection with the discussion of the Wall patent and need not be repeated. This invention assures positive closure, Koch doesn't.

U.S. Pat. No. 1,447,231 (Barry) issued Mar. 6, 1923 fails to show or suggest a ball valve in which the ball is in direct contact with the activating lobe of a cam member which, upon rotation, causes the selective opening and closing of the ball valve. A tube 20 is interposed between cam 25 and ball 16 in Barry. Tube 20 must slide in cock casing 14 in order to cause tip 21 to engage ball 16. Corrosion can, and is likely to, form on the outer surface of tube 20 and on the inner surface of casing 14 resulting in a non-positive seating of ball 16 in seat 17. This invention avoids that problem by having direct drive of the ball by the cam lobe.

U.S. Pat. No. 1,476,029 (Black) issued Dec. 4, 1923 fails to show direct driving contact between the cam lobe and the ball as claimed in this application. Instead there is interposed rod 30 which passes thru a recess 28 in bushing 10. This constricted region will be the situs of corrosion and sediment accumulation with a resulting sticking of valve stem 30 and an impositive closure of the valve. This invention avoids that problem by directly driving the ball from the cam lobe.

U.S. Pat. No. 1,496,317 (Johnson) issued June 3, 1924 fails to show or suggest a ball valve in which the ball is moved by direct contact with a cam lobe, as claimed for this invention. Further, plunger 7 in Johnson can suffer from corrosion on its cylindrical surface.

Such corrosion can result in plunger 7 sticking in casing 2 and an impositive closing of the valve. It is to be noted that the water pressure in Johnson tends to keep the valve open, whereas in this application, the water pressure keeps the valve closed. The higher the pressure, the tighter the seal, in this invention.

U.S. Pat. No. 3,024,799 (Flieder) issued Mar. 13, 1962 fails to show or suggest a direct cam-lobe driven ball in a ball valve. Instead, there is an intermediate rod 40 (in tubular form). Rod 40 must move within lower end portion 18 of housing 17 to move ball 23. All of the possibilities, previously discussed for sticking of the ball actuating rod and impositive valve closing exist in the device of Flieder. The large area of contact between casing 18 and tube 40 exacerbates the potential problems.

SUMMARY OF THE INVENTION

Stated succinctly, by providing direct contact between the cam lobe of an actuating mechanism and the ball in the ball valve being actuated, positive valve action is assured. Further, by positioning the ball-valve seat combination in the liquid circuit so that the inward pressure of the liquid from a source forces the ball towards the seat and displacing the ball by the cam lobe against the source pressure, highly positive valve closure is assured.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood by reference to the following description taken in connection with the accompanying drawings, in which:

DETAILED DESCRIPTION OF THE PREFERRED EMBODIMENT

Figure 1:
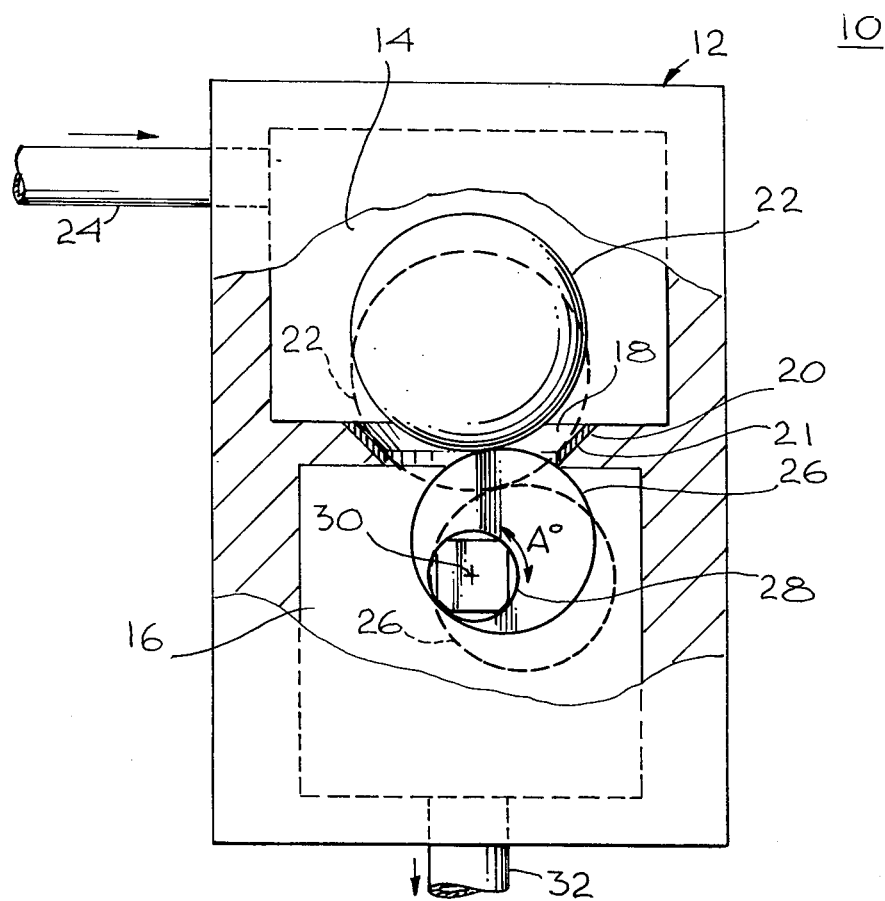
FIG. 1 is an elevational view, partially schematic and partially cut away, showing a valve according to this invention; and, FIG. 2 is an elevational view of an alternate form for a part of the mechanism of FIG. 1.

In FIG. 1, valve 10 includes shell or body 12 which may be of metal or plastic material. Shell or body 12 has an inlet chamber 14 and an outlet chamber 16 intercoupled for controlled liquid flow therebetween by a circular seating region 18. Seating region 18 may have a seat insert 20 of stainless steel or hard plastic material or may be free of any insert 20, relying on the material of the shell 12, itself, to form the seat 21. The seat insert 20 or seat 21 has a frustro-conical shape. In the closed condition of valve 10, ball 22 is in firm engagement with seat 21 or seat insert 20. Water flowing thru inlet 24 into inlet chamber 14 urges ball 22 to the dotted-line position shown in FIG. 1, i.e., into a positive closing of valve 10. Ball 22 may be made of metal, such as stainless steel, or of hard rubber or plastic material. It must have a smooth surface so as to exhibit, when in contact with seat 21 or seat insert 20, no voids thru which liquid can leak.

Cam lobe 26 is supported on shaft 28 for rotation about axis 30. Shaft 28 is rotatably supported near its opposite ends, in shell 12. One end of shaft 28 may be, for example, mechanically linked to the float arm in a toilet's flush tank, neither of which is shown here since the valve may be used in other environments. Upon rotary motion of shaft 28 around axis 30, for any reason, cam lobe 26 raises, or alternatively, lowers ball 22 causing valve 10 to be opened or closed, alternatively. The angle of rotation A° of shaft 28 may be in the range of 30° to 50° to effect a complete opening and closing of valve 10. When, for example, shaft 28 is rotated so that ball 22 is in the dotted-line position in FIG. 1, ball 22 engages seat 21 or seat insert 20. The pressure differential between the top and bottom of ball 22 causes ball 22 to firmly engage seat 21 or seat insert 20. A positive closure results.

When shaft 28 is rotated in an opposite direction in FIG. 1, for example by an angle in the order of 45°, ball 22 is lifted out of seat 21 or seat insert 20 permitting liquid to flow from inlet chamber 14 to outlet chamber 16, and, thence, thru outlet 32 into a flush tank, for example.

It is to be noted that there is direct and positive movement of ball 22 by cam lobe 26 upon rotation of shaft 28 around axis 30 and said cam lobe 26 being in direct contact with said ball 22 in all operative positions of said cam lobe 26 to prevent sticking of said ball 22 on said seating region 18. There is no intermediate element which must slide, as the prior art teaches. The elimination of the intermediate element reduces cost, complexity and most of all, chances of malfunctioning of the valve as a result of corrosion, sediment or algae accumulation.

Figure 2:
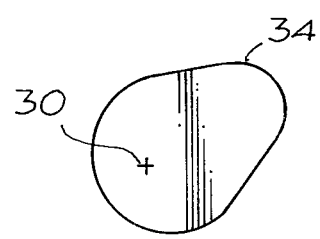

In some applications the rate of opening or closing valve 10 may be varied. In such cases, cam lobe 26 may be non-circular in shape, for example it may be shaped as shown in FIG. 2. Cam lobe 34 rotates about axis 30 but raises and lowers ball 22 at a variable rate differing from that realized with the circular lobe 26. In actual operation quiet and positive action of valve 10 has been realized by shaping cam lobe 26 as shown at lobe 34 in FIG. 2. The shape of cam lobe 26 may be described as "quasi-elliptical". Further, such results have been obtained over a large range of inlet pressures.

While particular embodiments of the present invention have been shown and described, it will be obvious to those skilled in the art that changes and modifications may be made without departing from my invention in its broader aspects, and, therefore, the aim of the appended claims is to cover all such changes and modifications as fall within the true spirit and scope of my invention.

I claim:
1. A valve for the control of fluid flow, including:
   a body portion, said body portion having an inlet chamber and an outlet chamber, said inlet chamber having an inner transverse dimension, said outlet chamber having a wall;
   a seating region interposed between said inlet chamber and said outlet chamber and having an opening therethrough for permitting fluid flow between said inlet chamber and said outlet chamber;
   a ball residing in said inlet chamber and having a diameter and a cross-sectional shape corresponding to the size and cross-sectional shape of said opening in said seating region;
   said diameter of said ball being substantially less than said inner transverse dimension of said outlet chamber;
   said ball being movable from a position in engagement with and closing said opening in said seating region to a position, within said inlet chamber, significantly spaced from said opening;
   whereby fluid may flow freely from said inlet chamber to said outlet chamber;
   shaft means rotatably supported in said wall of said outlet chamber below said seating region and having an operating portion thereof extending through the wall of said outlet chamber;
   cam means, including a camming surface, eccentrically supported from said shaft;
   said camming surface being continuous and being non-concave throughout the extent thereof and having a quasi-elliptical shape;
   said camming surface being in direct contact with said ball through an arcuate rotational path in all operative positions of said camming surface, to prevent sticking of said ball on said seating region whereby upon rotation of said shaft means said ball is moved smoothly and gradually by said camming surface as said camming surface moves through said arcuate path and as said ball moves from a position in engagement with and closing said opening in said seating region to a position removed from said opening in said seating region.

2. Apparatus according to claim 1 in which said seating region is frustro-conical in shape.

3. Apparatus according to claim 1 in which said seating region has an insert.

4. Apparatus according to claim 3 in which said insert is of stainless steel.

5. Apparatus according to claim 1 in which said shaft means extends through opposed openings in said wall of said outlet chamber.

6. Apparatus according to claim 5 in which said shaft is in direct contact with said wall as it passes therethrough whereby a packing-free bearing is formed.

7. Apparatus according to claim 1 in which said ball is of hard rubber.

* * * * *